(12) United States Patent
Olsson et al.

(10) Patent No.: US 7,317,733 B1
(45) Date of Patent: Jan. 8, 2008

(54) APPARATUS, SYSTEM, AND METHOD FOR PROTOCOL CONVERSION IN TRANSCEIVER MODULES

(75) Inventors: Fredrik Olsson, Los Altos, CA (US); Hojjat Salemi, Rockcliffe (CA)

(73) Assignee: Cortina Systems, Inc., Sunnyvale, CA (US)

( * ) Notice: Subject to any disclaimer, the term of this patent is extended or adjusted under 35 U.S.C. 154(b) by 857 days.

(21) Appl. No.: 10/643,633

(22) Filed: Aug. 18, 2003

(51) Int. Cl.
*H04J 3/16* (2006.01)
(52) U.S. Cl. .................................... 370/466
(58) Field of Classification Search ............... 370/466, 370/503, 400, 401, 408, 465, 474, 527, 528, 370/529; 375/363
See application file for complete search history.

(56) References Cited

U.S. PATENT DOCUMENTS

| | | | |
|---|---|---|---|
| 5,550,816 A * | 8/1996 | Hardwick et al. | 370/397 |
| 6,775,300 B2 * | 8/2004 | Kuo | 370/503 |
| 6,963,561 B1 * | 11/2005 | Lahat | 370/356 |
| 7,139,255 B1 * | 11/2006 | Blackburn | 370/331 |
| 7,164,692 B2 * | 1/2007 | Cox et al. | 370/466 |

OTHER PUBLICATIONS

SFF Committee, "Proposed Specification for GBIC (Gigabit Interface Converter)," Rev 5.5, Sep. 27, 2000, Printing Aug. 16, 1999, pp. 1-65, fission.dt.wdc.com/pub/standards/sff/spec.
SFF Committee, "Gigabit Interface Converter (GBIC)," SFF document No. SFF-805223, revision 5.5, Sep. 27, 2000, pp. 1-65.
SFF Committee, "INF-80741 Specification for "SFP (Small Formfactor Pluggable) Transceiver," Rev 1.0, May 12, 2001."
IEEE Computer Society, "IEEE Standard for Information Technology-Telecommunications and Information Exchange between System . . . ," IEEE Standards 802.3ae™ -2002, Aug. 30, 2002, pp. 1-515, (The Institute of Electrical and Electronic Engineers, Inc., New York 2002).

* cited by examiner

*Primary Examiner*—Chi Pham
*Assistant Examiner*—Alexander O. Boakye
(74) *Attorney, Agent, or Firm*—Cooley Godward Kronish LLP (57) ABSTRACT

A transceiver module includes a protocol converter for converting between the data protocol of a host and a network. In one embodiment the module performs protocol conversion between a TDM data protocol of an external network and a gigabit Ethernet data protocol of host, thereby eliminating the need for additional line cards to perform protocol conversion.

28 Claims, 6 Drawing Sheets

APPARATUS, SYSTEM, AND METHOD FOR PROTOCOL CONVERSION IN TRANSCEIVER MODULES

FIELD OF THE INVENTION

The present invention is generally related to protocol conversion in small form factor modules and gigabit interface converter modules.

BACKGROUND OF THE INVENTION

Gigabit Interface Converters (GBICs) are transceivers that act as interface converters, typically acting as an interface between an electrical signal domain and a fiber optical domain. GBICs are small form factor (SFF) transceiver modules having a standardized form factor and electrical interface connections. GBICs are commonly employed in fiber optic and Ethernet systems as an interface for high speed networking, such as acting as a switch/router interface to other portions of a network. GBICs are also sometimes used as an interface to copper cables, such as high data rate enterprise lines. Small Formfactor Puggable transceivers (SFPs) also act as interference converters and have a standardized form factor and electrical interface. Their usage is the same as GBICs.

The Small Form Factor Committee has issued a multiple source agreement (MSA) defining mechanical attributes of SFF modules in the "SFP (Small Formfactor Pluggable) Transceiver Specification, Rev 1.0, of May 12, 2001, the contents of which are hereby incorporated by reference. The SFF Committee has also issued a standard for SFF GBIC modules, the "GBIC Interface Converter (GBIC)" specification, Revision 5.5, of Sep. 27, 2000, the contents of which are also hereby incorporated by reference.

Figure 1:
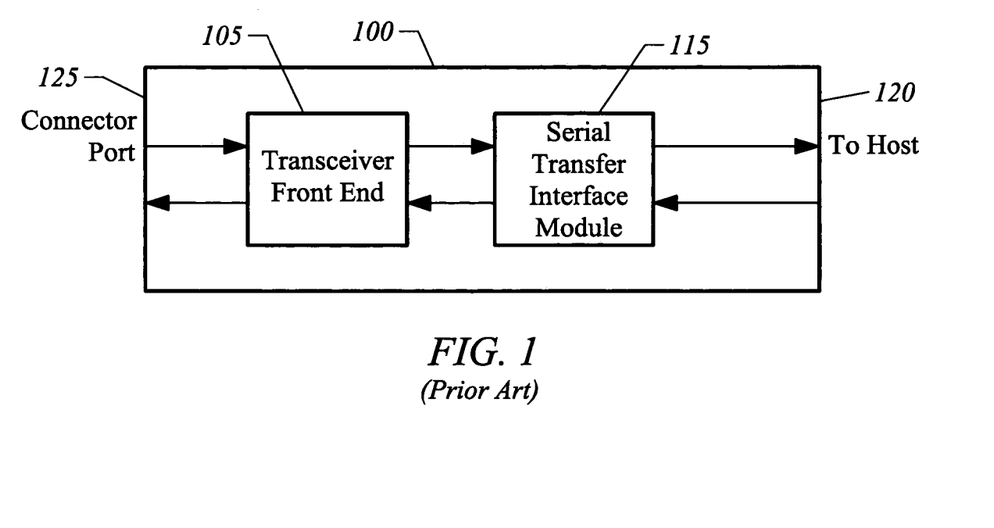
FIG. 1 is a block diagram of a prior art GBIC module.

The GBIC and SFP specifications define standards for the form factor and electrical interfaces of pluggable modules to allow interoperability between different vendors. Referring to FIG. 1, a block diagram of a generic small form factor module 100 is illustrated. An outgoing serial data stream from a host 120 is received at a serial transfer interface 115. The transfer interface may, for example, include a positive emitter coupled logic (PECL) driver. A transmitter portion of a transceiver is used to transmit the outgoing serial data stream to a connector port 125 leading to an external network. An incoming serial data stream is received by a receiver associated with transceiver 105. The serial transfer interface is used to couple the incoming serial data stream from the receiver to the host. The transfer interface may, for example, include a PECL terminator for coupling the incoming serial data stream to the host.

Figure 2:
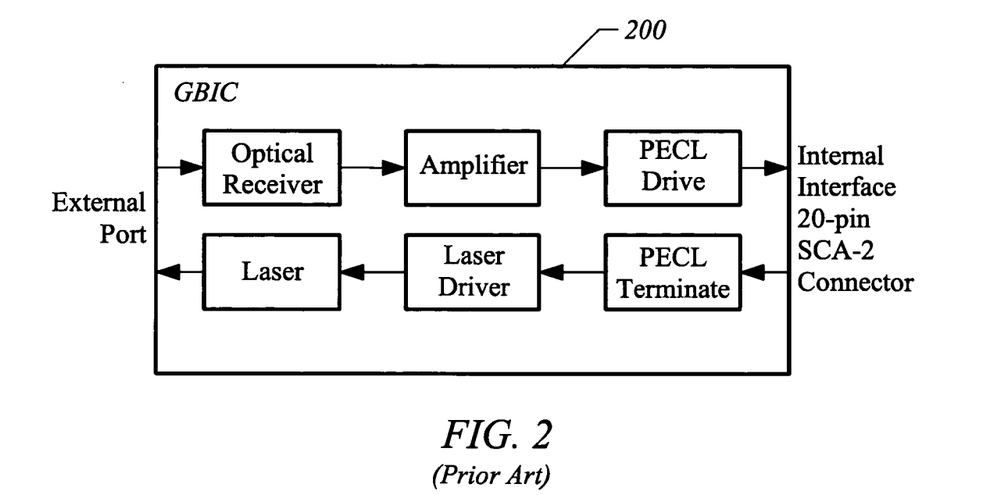
FIG. 2 is a block diagram of a prior art GBIC module.

FIG. 2 is a block diagram of GBIC module showing components of an optical transceiver. As illustrated in more detail with regards to FIG. 2, a GBIC module 200 may include an optical receiver and associated amplifier circuit for receiving an incoming serial data stream. A laser driver and laser may be used as an optical transmitter.

The GBIC specification has provided a standard by which standardization of mandatory GBIC features permits high volume production of GBIC modules, thereby reducing GBIC module costs. However, while GBIC modules perform the same minimum set of functions defined by the GBIC specification, the application of GBIC modules may require additional interface components between the router and the GBIC module. In particular, in some applications the network utilizes a different data protocol than the host. This necessitates the use of custom line cards for coupling signals between the GBIC and the router.

Therefore, what is desired is an apparatus, system, and method to increase the functionality of GBIC modules.

SUMMARY OF THE INVENTION

A small form factor (SFF) transceiver module is disclosed that provides protocol conversion between a host, such as a router, and a network. Integration of protocol conversion within a transceiver module eliminates the need for custom line cards for performing protocol conversion between a transceiver module and a router, facilitating system design. In one embodiment, the transceiver module is a GBIC module. In another embodiment, the transceiver module is a SFP module.

In one embodiment of a method of protocol conversion, the host has a gigabit Ethernet (GE) data protocol and the network has a time division multiplexed (TDM) data protocol. In this embodiment, the transceiver module converts GE serial data streams received from the host into TDM serial data streams and also converts TDM serial data streams received from the network into GE serial streams for the host. Examples of TDM data protocols include PDH, SDH, and SONET protocols.

In one embodiment of an apparatus, the transceiver module includes a serial transfer interface module for coupling an incoming serial data stream and an outgoing serial data stream with a host having a gigabit Ethernet (GE) data protocol; a transceiver for coupling an incoming serial data stream and an outgoing serial data stream to a network having a time domain multiplexed (TDM) data protocol; and a protocol converter coupling the serial transfer interface and the transceiver, said protocol converter operative to convert an incoming TDM serial data stream received from the external network into a GE serial data stream for the host, the protocol converter also operative to convert an outgoing GE serial data stream received from the host into a TDM serial data stream for the external network.

In one embodiment of a system, the transceiver module with protocol conversion is coupled to a router. Since the transceiver module provides protocol conversion, additional line cards or providing protocol conversion between the module and the router are not required. Additionally, in one embodiment the module and the router communicate with each other through in-band Ethernet frames.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention generally comprises an apparatus, system, and method for performing protocol conversion within a transceiver module, such as GBIC or Small Form-factor Pluggable module. Referring to the block diagram of FIG. 3, in one embodiment of the present invention a transceiver module 300 includes a front-end transceiver 310 that includes transceiver components for transmitting and receiving serial data streams with an external network via a connector port 325. In one embodiment, transceiver module 300 is a GBIC, although it will be understood that the present invention is also applicable to SFP modules as well.

Figure 3:
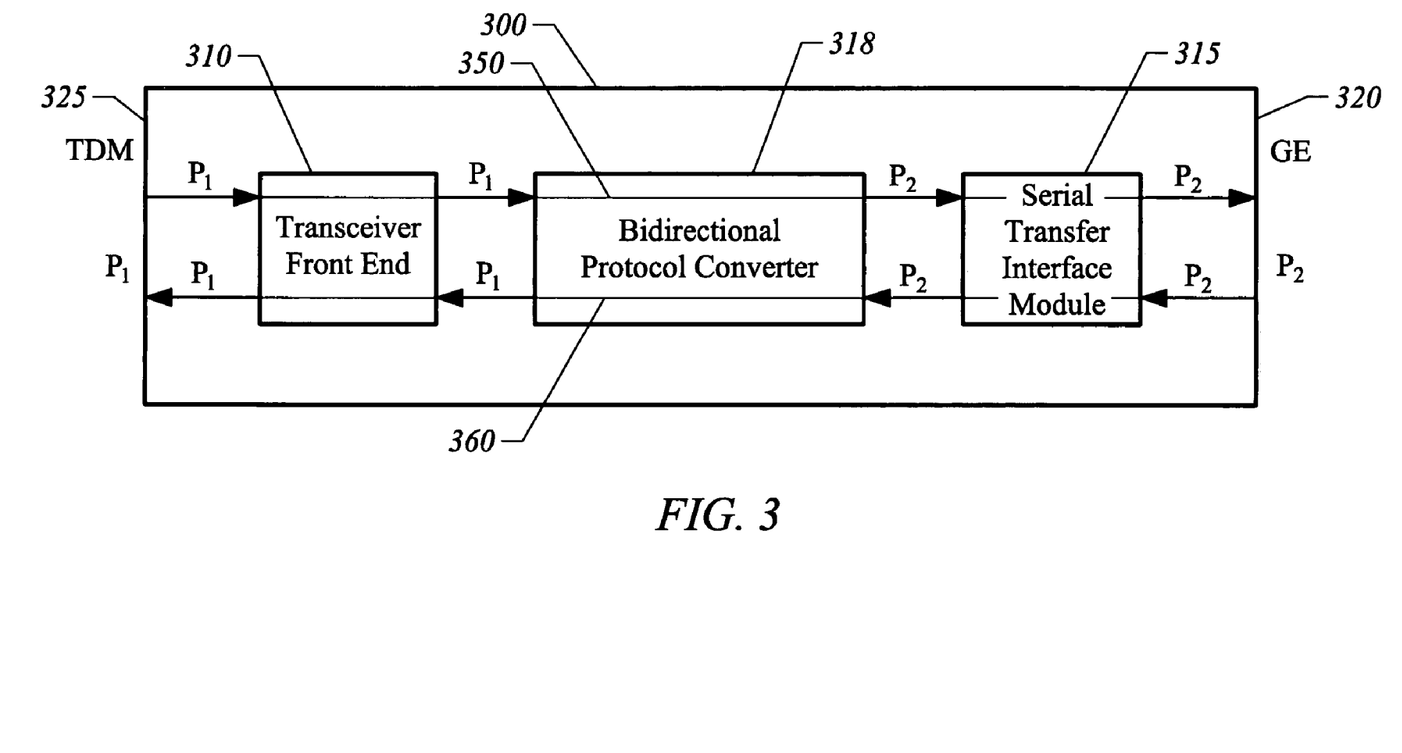
FIG. 3 is a block diagram of a transceiver module with protocol conversion in accordance with one embodiment of the present invention.

The transceiver 310 may include any transceiver used in transceiver modules for communicating with an external network. In one embodiment, the transceiver is an optical transceiver that includes an optical receiver and amplifier and an optical transmitter comprising a laser and a laser driver. The characteristics of the optical transceiver may depend upon the application. For example, the transceiver may have having different optical components depending upon whether it is designed for short reach or long reach optics. Alternatively, the transceiver components may be adapted for driving copper cables and include an analog front-end receiver and an analog front-end transmitter with suitable line drivers for driving copper cables.

A serial transfer interface module 315 is provided for receiving and transmitting serial data streams with a switch/router via a host interface 320. The serial transfer interface module 315 preferably comprises a PECL driver and a PECL terminator. In some embodiments, host interface 320 may comprise a 20-pin SCA-2 Connector in accordance with the SFF specification.

There are two data paths in module 300. A first data path 350 is for an incoming data stream received from the connector port 325 and directed towards the host. The second data path 360 is for an outgoing data stream received from the host interface 320 and directed towards the external network.

A protocol converter 318 couples the front-end transceiver 310 to the serial transfer interface module 315 and provides protocol conversion for each of the data paths 350 and 360. For first data path 350, protocol converter 318 receives a serial data stream from an external network having a first protocol, P1, and converts the protocol to a second protocol, P2, associated with a host. Conversely, for second data path 360, protocol converter 318 receives an outgoing serial data stream from the host having a protocol of P2, and converts the P2 protocol of the host into the P1 protocol of the network coupled to the connector port.

In one embodiment, the host is a switch or a router having a gigabit Ethernet (GE) protocol for serial data streams such that the P2 protocol is a GE protocol. The GE protocol is described in the institute of electrical and electronics engineers (IEEE) standard 802.3ae of June 2002, the contents of which are hereby incorporated by reference. The GE standards specifies that a medium access control (MAC) protocol encapsulates payload data by adding a header and includes cyclic redundancy check bits. MAC includes algorithms to control access to shared-media networks like Ethernet. Entire frames are preceded by a small idle period. High data rate Ethernet, such as 1 Gb/s, requires that a medium access controller (MAC) also have an associated PHY module that includes a physical coding sublayer (PCS) and physical medium attachment (PMA) sublayer. A switch is a network node that forwards packets from inputs to output s based on header information in each packet. A router is a network node connected to two or more networks that forwards packets from one network node to another.

In one embodiment, the external network is a time division multiplexed (TDM) network such that the P1 protocol is a TDM protocol. Examples of TDM protocols include optical TDM protocols, such as synchronous digital hierarchy (SDH) and synchronous optical network (SONET) protocols. SONET is a synchronous hierarchy defined by Committee T1 in the United States whereas SDH is an international equivalent defined by ITU-T Recommendations. SONET is a clock based framing standard for digital transmission over optical fiber. For a SONET implementation, the connector port includes an optical fiber interface and transceiver 310 is an optical transceiver. In SONET, each optical carrier (OC) standard defines a rate of optical transmission. Consequently, for a SONET embodiment, the protocol further includes attributes associated with the OC value. Examples of SONET data rates include OC-3/STM-1, OC-12/STM-4, and OC-48/STM-16 output.

Other examples of TDM protocols include plesiosynchronous digital hierarchy (PDH). PDH utilizes links comprised of wire pairs. PDH includes the TN carrier system in North America (NADH), the En carrier system in Europe (EDH), and the J-n carrier system in Japan (JDH). PDH signals may be described in terms of a "T" number (North America) or an "E" number (Europe), with the number having an associated data rate along with other attributes of transmission. For a PDH implementation, the connector port requires a suitable copper connector and receiver 310 may include an analog front end with line drivers for driving signals on copper cables. For T1/E1 PDH, a copper RJ-48 connector is used. The T1 connector is a telephone carrier service operating at 1.544 Mbps. The E1 has a transmission rate of 2.048 Mbps on E1 communication lines. For T3/E3 PDH, a copper BNC connector is used. The T3 is a telephone carrier service operating at 44.736 Mpbs. The E3 signal has a data rate of 34.368 Mbps.

Protocol converter 318 may have circuitry dedicated to performing only one type of protocol conversion. Alternatively, in one embodiment protocol converter 318 includes modules for performing a plurality of different conversions (e.g., GE-T1/E1, GE-T3/E3, GE-OC-3, GE-OC-12, and GE-OC-48), such that the module may be used for performing two or more different protocol conversions. In this embodiment, one of the protocol conversions is selected for use (e.g., with a control signal). Alternatively, a controller (not shown) may determine the protocol of a network and automatically select the appropriate protocol conversion type. The controller may input a mode selection to an EEPROM memory of the GBIC interface using the serial data interface defined by the SFF and GBIC standards. Alternatively, as described below in more detail, in one embodiment the command information may be sent to the module embedded in an in-band Ethernet frame.

Protocol conversion between GE and TDM includes protocol conversion of header/trailer fields and frame attributes. Additionally, protocol conversion is facilitated by converting serial data streams into parallel format (having a plurality of lanes with a slower data rate per lane than the serial data stream).

Referring to second data path 360, in one embodiment a serial GE data stream received from a host is deserialized, the Ethernet frames recovered, and then the frame payload is encapsulated (mapped) in accordance with the encapsulation protocol. The encapsulated frame data is then framed in accordance with the TDM protocol and re-serialized. Encapsulation is the process of attaching a protocol specific header and/or trailer to a message to facilitate frame delineation and error checking at the receiving end. Examples of encapsulation protocols include a generic framing procedure (GFP), packet over SONET (POS), high level data link control protocol (HDLC), and frame relay (FR). HDLC is an ISO standard link-level protocol that uses bit stuffing to achieve frame delineation. HDLC manages synchronous serial information transfer over a link connection and includes a method to encapsulate data over synchronous serial links using frame characters and checksums. POS defines check sums for detecting errors, and is described in RFC 1662. Frame Relay is a connection-oriented public packet-switched service offered by carriers. Frame relay is a synchronous HDLC protocol based network including a bridge control protocol (BCP).

Referring to the first data path 350, in one embodiment, protocol converter deserializes incoming TDM data, deframes the data, de-encapsulates the data to recover the original GE frames, and then re-serializes the data stream.

In a TDM/GE embodiment, the data rate of GE data stream is typically much faster than the TDM data stream. In order to avoid an overflow condition, Ethernet flow control may be used to perform rate matching. In a flow control embodiment, if buffers in module 300 are getting full, the module sends a pause message to the host to temporarily reduce the amount of data that it is sending.

Figure 4:
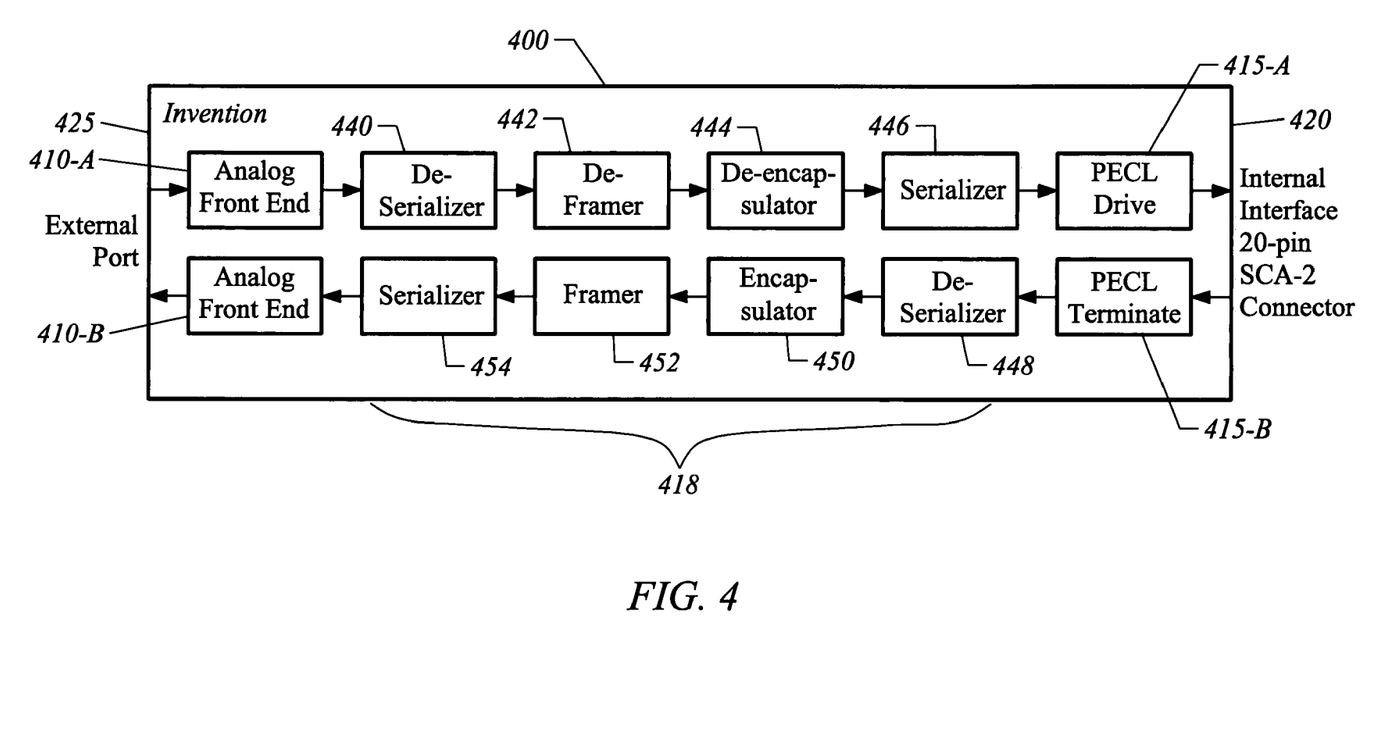
FIG. 4 is a block diagram of a transceiver module with protocol conversion in accordance with one embodiment of the present invention.

FIG. 4 is a block diagram of another embodiment of a transceiver module 400 of the present invention. A transceiver front end includes an analog front end receiver 410-A and an analog front end transmitter 410-B. A serial transfer interface includes a PECL driver 415-A and a PECL terminator 415-B. In this embodiment, the protocol converter 418 includes a deserializer 440, deframer 442, de-encapsulator 444, serializer 446, serializer 454, framer 452, encapsulator 450, and de-serializer 448. An incoming serial data stream received by analog front end 410-A is deserialized in deserializer 440, e.g., converted from a serial to a parallel data format to facilitate subsequent data manipulation. A deframer 442 defames the data stream. A de-encapsulator 444 removes encapsulation data to convert the protocol to that of the host. A serializer 446 then restores the data stream to a serial data format. An outgoing data stream received by PECL 415-B is deserialized by deserializer 448. The data stream is then encapsulated in encapsulator 450 to convert its protocol. The data stream is then framed in framer 452. The framed data is then converted into a serial data stream in serializer 454.

Figure 5:
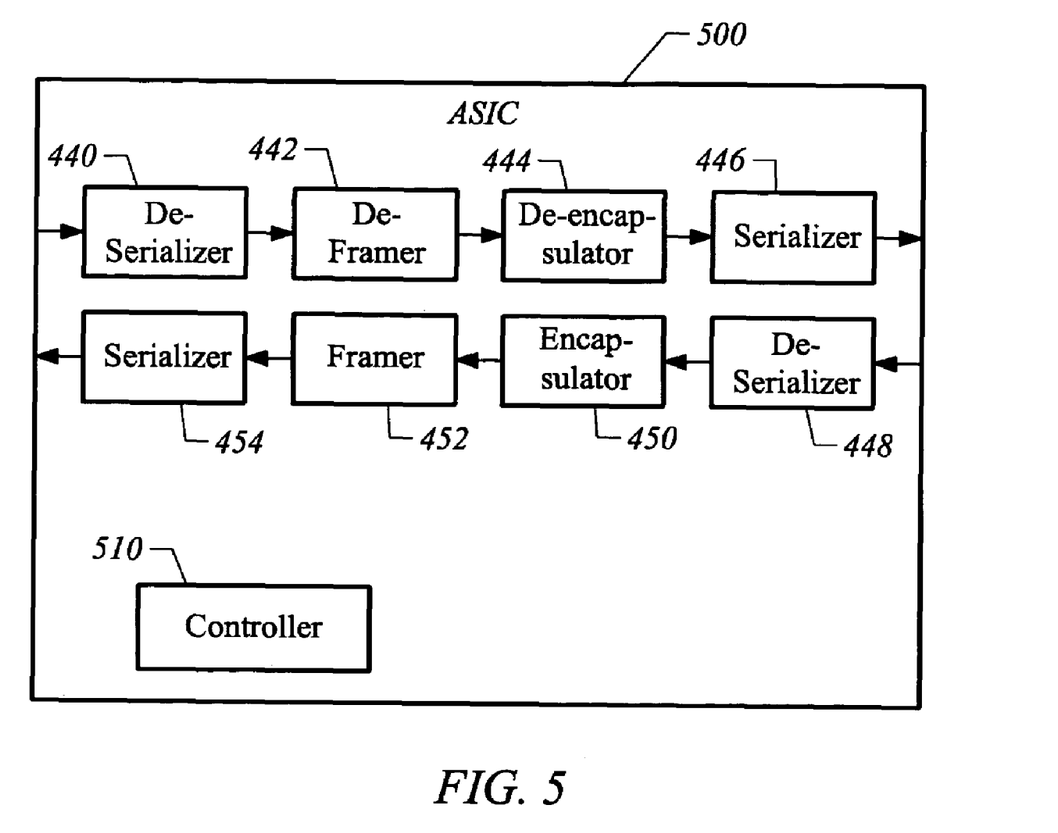
FIG. 5 is a block diagram of one embodiment of an ASIC for performing protocol conversion in accordance with one embodiment of the present invention.

As illustrated in FIG. 5, protocol converter 418 may be formed on an integrated circuit 500, i.e., as an application specific integrated circuit (ASIC). Integration reduces the size of the components, which is beneficial in light of the severe space constraints imposed by the size limitations of the SFF standard. Integration also facilitates adding additional features. In one embodiment, a local controller 510 is included in ASIC 500 for performing control functions.

Figure 6:
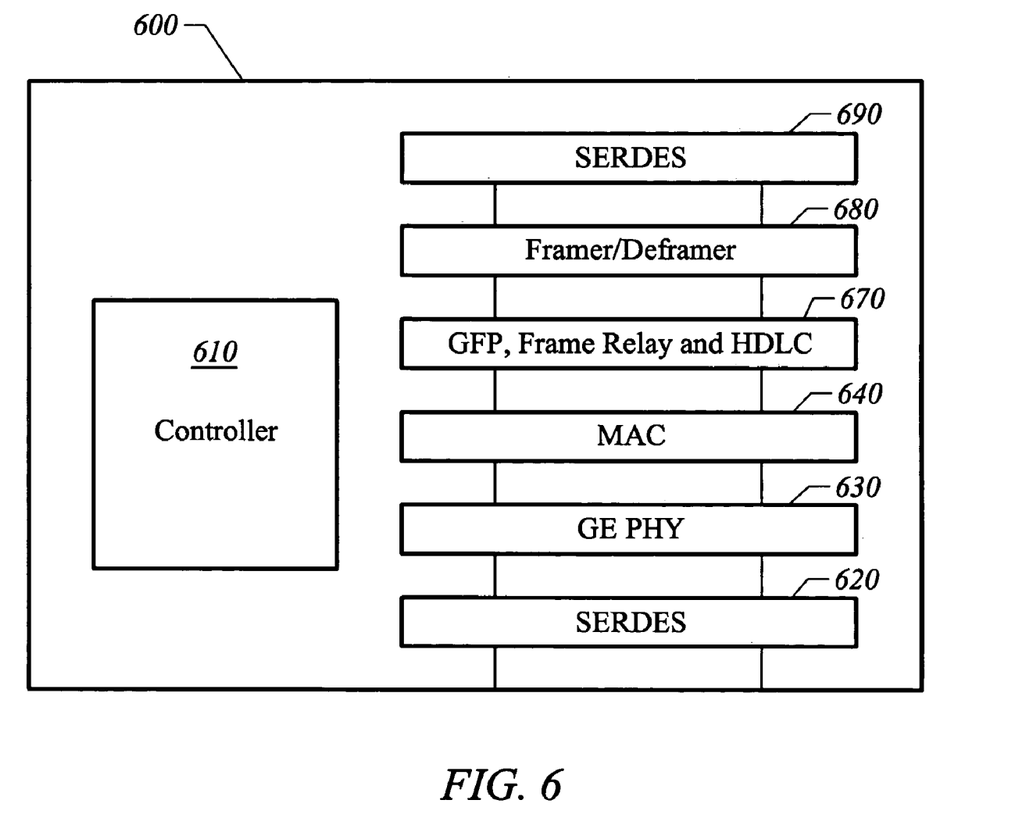
FIG. 6 is a block diagram of one embodiment of an ASIC for performing protocol conversion in accordance with one embodiment of the present invention.

FIG. 6 illustrates an embodiment of a protocol converter ASIC 600 for TDM/GE protocol conversion. In this embodiment a host-end SERDES 620 is included to deserialize an incoming serial data stream and serialize an outgoing data stream. A gigabit Ethernet PHY module 630 is used to couple SERDES 620 to a medium access control (MAC) module 640. The MAC is coupled to an encapsulation module 670 for implementing an encapsulation protocol, such as Frame Relay, HDLC, or GFP. At any one time, there is only one encapsulation protocol in use (FR, HDLC, or GFP) and only one TDM protocol (e.g., T1, T3, OC-3, or OC-12). A framer/deframer 680 is provided for framing and deframing. A connector end SERDES 690 is provided to serialize an outgoing serial data stream and deserialize an incoming data stream. A controller 610 may be included. In one embodiment, controller 610 is coupled to MAC 640 and is adapted to communicate in-band Ethernet frames from a host.

Figure 7:
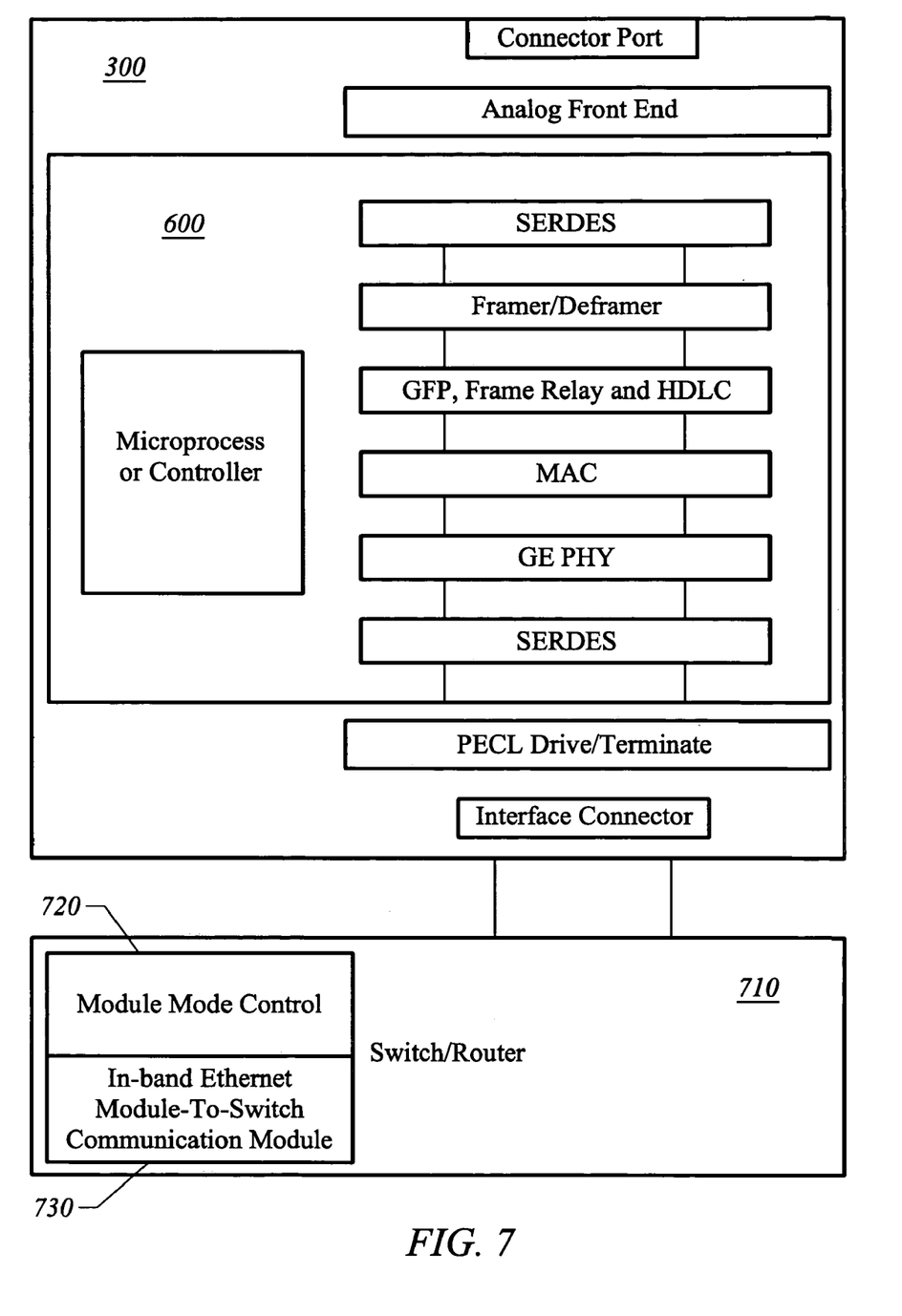
FIG. 7 is a block diagram of a system in accordance with one embodiment of the present invention.

FIG. 7 illustrates a system in accordance with one embodiment of the present invention. A protocol converter ASIC, such as ASIC 600 is included in module 300, transceiver module 300 is coupled to a switch/router 710.

In one embodiment, switch/router 710 include a module-to-switch communication module 730 and a module mode control module 720, which may be implemented as software entities residing in a memory of switch/router 710. Using a MAC address of the module, the switch/router 710 may then prepare individual Ethernet frames containing one or more commands for the module 300. The switch/router 710 then inserts the frames in-band with other frames. The in-band frames include the MAC address of the module 300. The module 300 receives the in-band Ethernet frames, from which it may receive command information. In some embodiments, module 300 may also respond to commands by sending in-band Ethernet frames to the MAC address of switch/router 710. Some examples of commands that the switch/router 710 may send include on/off commands, polling of bit errors, polling of overflow, a loopback command, or a command to communicate valid signals are coming in.

Additionally, as previously described, in some embodiments, switch/router 710 may also issue commands to module 300 to select the protocol conversion mode. In this embodiment, module mode controller 720 issues a command for the module to perform a specific protocol conversion (e.g., TDM-OC-12, TDM-T1, etc.).

The MAC address of module 300 may be set in a variety of different ways, such as by an external command, a command from switch/router 710, or a negotiation process between switch/router 710 and module 300.

The present invention provides several benefits. First, since protocol conversion is provided in a SFF transceiver module, the need for custom line cards to perform protocol conversion between the transceiver module and a router is eliminated. Second, in-band Ethernet frames may be used to communicate between a router and a transceiver module.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

While embodiments of the present invention have been described in regards to GBIC modules, it will be understood that the present invention may also be applied to other types of form-defined transceiver modules, such as SFP modules or other types of Small Formfactor Pluggable transceiver modules.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A small form factor transceiver module, comprising:
   a serial transfer interface for coupling an incoming serial data stream and an outgoing serial data stream with a host having a gigabit Ethernet (GE) data protocol;
   a transceiver for coupling said incoming serial data stream and said outgoing serial data stream to an external network having a time domain multiplexed (TDM) data protocol;
   a protocol converter coupling said serial transfer interface and said transceiver, said protocol converter operative to convert an incoming TDM serial data stream received from said external network into a GE serial data stream for said host, said protocol converter also operative to convert an outgoing GE serial data stream received from said host into a TDM serial data stream for said external network;
   wherein said protocol converter includes:
   a first protocol converter disposed along a first data path associated with said incoming serial data stream, comprising:
      a deserializer to deserialize a TDM serial data stream into a parallel TDM data stream;
      a deframer for deframing said parallel TDM data stream;
      a de-encapsulator to de-encapsulate said parallel TDM data stream and perform protocol conversion to generate a de-encapsulated parallel GE data stream; and
      a serializer to convert the de-encapsulated parallel GE data stream into a serial GE data stream; and
   a second protocol converter disposed along a second data path associated with said outgoing serial data stream, comprising:
      a deserializer to deserialize a GE serial data stream to form a parallel GE data stream;
      an encapsulator to encapsulate said parallel GE data stream into said TDM protocol;
      a framer coupled to said encapsulator for generating TDM frames; and
      a serializer receiving an output of said framer to covert said parallel data stream into a serial TDM data stream;
   wherein said transceiver module is operative as both a transceiver and as a protocol converter.

2. The module of claim 1, wherein said protocol converter is formed on an integrated circuit.

3. The module of claim 1, wherein said TDM protocol is a TDM protocol selected from the group consisting of synchronous data hierarchy (SDH), synchronous optical network (SONET) and a plesiosynchronous data hierarchy (PDH).

4. The module of claim 1, further comprising: a controller configured to communicate control information with said host via interband Ethernet frames exchanged with said host.

5. The module of claim 1, wherein said TDM protocol is a plesiosynchronous data hierarchy (PDH) protocol adapted for T1/E1 signals.

6. The module of claim 1, wherein said TDM protocol is a plesiosynchronous data hierarchy (PDH) protocol adapted for T3/E3 signals.

7. The module of claim 1, wherein said TDM protocol is a SONET protocol selected from the group consisting of OC-3/STM-1, OC-12/STM-4, and OC-48/STM-16.

8. The module of claim 1, wherein said protocol converter is configured to perform protocol conversion including at least one member from the group consisting of: GFP (generic framing procedure) mapping, POS/HDLC (packet over SONET/high level data link control protocol) mapping, and frame relay mapping.

9. A small form factor transceiver module, comprising:
   a serial transfer interface for coupling an incoming serial data stream and an outgoing serial data stream with a host having a gigabit Ethernet (GE) data protocol;
   a transceiver for coupling said incoming serial data stream and said outgoing serial data stream to an external network having a time domain multiplexed (TDM) data protocol;
   a protocol converter coupling said serial transfer interface and said transceiver, said protocol converter operative to convert an incoming TDM serial data stream received from said external network into a GE serial data stream for said host, said protocol converter also operative to convert an outgoing GE serial data stream received from said host into a TDM serial data stream for said external network; and
   wherein said transceiver module is operative as both a transceiver and as a protocol converter;
   wherein said protocol converter includes;
      a first SERDES for coupling data to said serial transfer interface;
      a Gigabit Ethernet physical (PHY) module coupled to exchanged data between said first SERDES and a MAC (medium access control) module;
      an encapsulation module coupled to said MAC (medium access control) module to perform an encapsulation protocol selected from the group consisting of frame relay, HDLC (high level data link control protocol), and GFP (generic framing procedure);
      a framer coupled to the output of said encapsulation module; and
      a second SERDES for coupling data between said framer and said transceiver.

10. The module of claim 9, further comprising: a controller coupled to said MAC module, said controller adapted to communicate control information with said host via interband Ethernet frames exchanged on a host interface.

11. The module of claim 9, wherein said protocol converter is formed on an integrated circuit.

12. The module of claim 9, wherein said TDM protocol is a plesiosynchronous data hierarchy (PDH) protocol adapted for T1/E1 signals.

13. The module of claim 9, wherein said TDM protocol is a plesiosynchronous data hierarchy (PDH) protocol adapted for T3/E3 signals.

14. The module of claim 9, wherein said TDM protocol is a SONET protocol selected from the group consisting of OC-3/STM-1, OC-12/STM-4, and OC-48/STM-16.

15. The module of claim 9, wherein said protocol converter is figured to perform protocol conversion including at least one member from the group consisting of: GFP mapping, POS/HDLC (packet over SONET/high level data link control protocol) napping, and frame relay mapping.

16. A system, comprising:
a router having a gigabit Ethernet (GE) data protocol; and
a small form factor interface converter transceiver module for coupling data between said router and a connection port of an external network having a time division multiplexed (TDM) data protocol, the transceiver module comprising:
 a serial transfer interface module for coupling an incoming serial data stream and an outgoing serial data stream to a host having a gigabit Ethernet (GE) data protocol;
 a transceiver for coupling said incoming serial data stream and said outgoing serial data stream to an external network having a time domain multiplexed multiplexed (TDM) data protocol; and
 a protocol converter coupling said serial transfer interface and said transceiver;
  said protocol converter operative to convert an incoming TDM serial data stream received from said external network into a GE serial data stream for said host,
  said protocol converter also operative to convert an outgoing GE serial data stream received from said host into a TDM serial data stream for said external network a first SERDES for coupling data to said serial transfer interface;
  said protocol converter including:
   a Gigabit Ethernet PHY (physical) module coupled to exchanged data between said first SERDES and a MAC (medium access control) module;
   an encapsulation module coupled to said MAC module to perform an encapsulation protocol selected from the group consisting of frame relay, HDLC (high level data link control protocol), and GFP (generic framing procedure);
   a framer coupled to the output of said encapsulation module; and
   a second SERDES for coupling data between said framer and said transceiver.

17. The system of claim 16, further comprising: a controller coupled to said MAC module, said controller configured to communicate control information with said host via interband Ethernet frames exchanged on a host interface.

18. A method of protocol conversion using a small form factor transceiver module for coupling a serial data stream between a router and an external network, comprising:
 within said module, converting a Gigabit Ethernet data protocol of a serial data stream received from said router into a time division multiplexed (TDM) protocol of said external network prior to transmitting said serial data stream to said external network; and
 within said module, converting said TDM protocol of a serial data stream received from said external network into said Gigabit Ethernet data protocol prior to transmitting said serial data stream to said router
 at said module, receiving at least one in-band Ethernet frame embedded within said several data stream received from said router; and
 identifying at least one command from said router contained with said at least one in-band Ethernet frame;
 wherein said module is operative as both a transceiver and as a protocol converter.

19. The method of claim 18, further comprising:
at said module, forming a message to said router; and
embedding said message in an in-band Ethernet frame transmitted in said serial data stream transmitted to said router.

20. The method of claim 18, wherein said module is capable of performing protocol conversion for a plurality of TDM data protocols, further comprising:
 configuring said module to perform protocol conversion for a selected TDM data protocol.

21. The method of claim 18, further comprising:
performing Ethernet flow control to match a data rate of said router and said external network.

22. The method of claim 18, wherein said TDM protocol is a SONET protocol, the method further comprising:
 using an optical transceiver to couple SONET signals to an optical fiber interface.

23. The method of claim 18, wherein said TDM protocol is a PDH protocol, the method further comprising:
 using an analog front end to couple PDH signals to copper cables.

24. A method of protocol conversion using a small form factor transceiver module for coupling a serial data stream between a router and an external network, comprising:
 within said module, converting a Gigabit Ethernet data protocol of a serial data stream received from said router into a time division multiplexed (TDM) protocol of said external network prior to transmitting said serial data stream to said external network; and
 within said module, converting said TDM protocol of a serial data stream received from said external network into said Gigabit Ethernet data protocol prior to transmitting said serial data stream to said router;
 at said module, forming a message to said router; and
 embedding said message in an in-band Ethernet frame transmitted in said serial data stream transmitted to said router;
 wherein said module is operative as both a transceiver and as a protocol converter.

25. The method of claim 24, wherein said module is capable of performing protocol conversion for a plurality of TDM data protocols, further comprising:
 configuring said module to perform protocol conversion for a selected TDM data protocol.

26. The method of claim 24, further comprising:
performing Ethernet flow control to match a data rate of said router and said external network.

27. The method of claim 24, wherein said TDM protocol is a SONET protocol, the method further comprising:
 using an optical transceiver to couple SONET signals to an optical fiber interface.

28. The method of claim 24, wherein said TDM protocol is a PDH protocol, the method further comprising:
 using an analog front end to couple PDH signals to copper cables.

* * * * *